B. WELTECK.

Improvement in Dining-Tables.

No. 127,720.

Patented June 11, 1872.

Witnesses
R. Boeckler
J. Goldberg

Inventor.
Bernhard Welteck

UNITED STATES PATENT OFFICE.

BERNHARD WELTECK, OF NEW YORK, N. Y.

IMPROVEMENT IN DINING-TABLES.

Specification forming part of Letters Patent No. 127,720, dated June 11, 1872.

Specification describing certain Improvements in Drop-Leaf Dining-Tables, invented by BERNHARD WELTECK, of the city, county, and State of New York.

In this invention the construction of the legs and frame, and also of the leaves and top of the table, separately, is the same as usually in the ordinary drop-leaf table. The invention relates to the manner of combining the frame and top of the drop-leaf table, and providing for the support of the leaves when required to be used in spread condition; and it consists in combining the top and frame of the drop-leaf table by means of a pivot with a shoulder to attach them together, and at the same time allowing the top to turn upon the frame, and permitting the leaves to drop over the sides of the frame when said top is turned with its leaves in parallel position with the sides of the frame and right angular to its ends, and causing the leaves to be held and properly supported in spread condition when turned with its leaves to a right-angular position with the sides of the frame.

Figure 1:
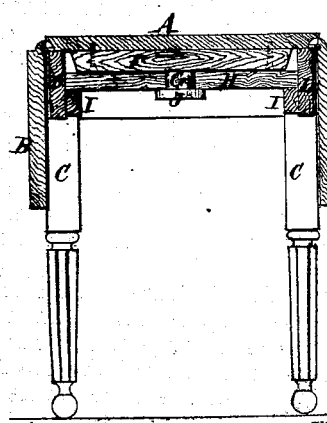
Figure 2:
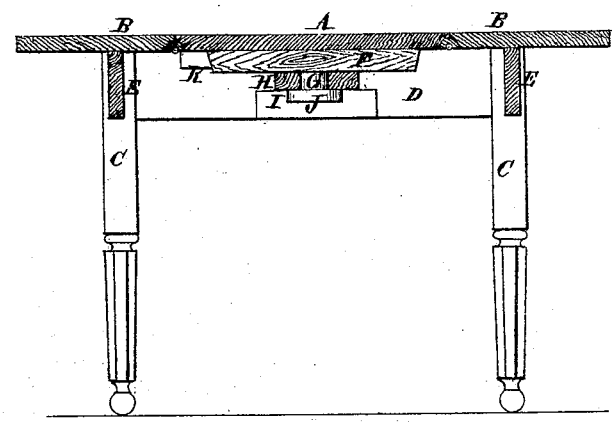
Figure 3:
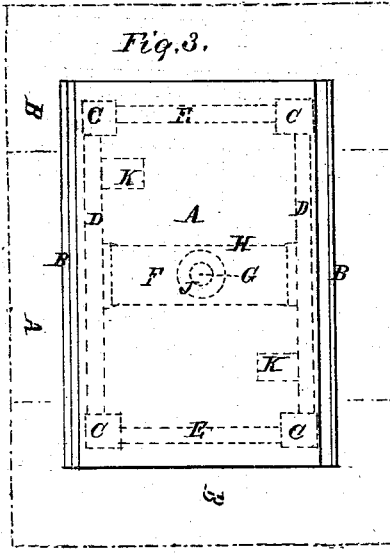

In the annexed drawing, Figure 1 represents a central vertical cross-section of the table, constructed with my improvements, and shown in position having its leaves dropped; Fig. 2, a central vertical longitudinal section of the same, shown in position when its leaves are spread and supported. Fig. 3 is a top view of the same, its leaves shown dropped in full lines, and its top turned and leaves spread, shown in dotted lines.

Similar letters of reference denote like parts in the several figures.

A represents the top of the table, to which are hinged the leaves B B. C C C C represent the legs of the table. Their top parts are mortised and united with the sides D D and end pieces E E, and constitute with them the frame of the table. Now, in order to support the leaves when spread, I employ across the central part of the top A a strong bridge-piece, F, which I firmly glue or secure with nails or screws to the said top, and to or in said piece F I secure a stud or pivot, G, in the central part, between the edges of the top A; and, to form or have a bearing for said pivot G, I employ a bridge-piece, H, across the central part of the frame of the table, between and from the sides D D, from one to the other; and to rest and secure said piece properly and with facility, I secure, previously, to the sides D resting-blocks I I. The bridge-piece H is provided with a central opening into which the pivot G is fitted to turn freely. The bottom face of the piece F may rest nearly close upon the top face of the piece H, and the bottom side of the leaves and top A should bear upon the top edge of the frame of the table. In order to prevent the top A from detaching from the frame of the table I provide the lower end of the pivot G with a shoulder or plate, J, to prevent its withdrawing from the bridge-piece H. In order to always stop the top A in proper relative position with the frame of the table whenever the same is to be used with spread leaves, one or more stopping-blocks, K, are secured to the proper place on the bottom side of the top A.

To spread the leaves of the table from the dropped position they are first raised and spread, and they and the top A are then turned together until the block or blocks K strike the sides D, upon which the leaves are allowed to rest upon the pieces E E.

Claim.

What I claim as my invention, and desire to secure by Letters Patent, is—

The revolving drop-leaf table, provided, for operating its top A and to support its leaves B B, with the bridge-pieces F and H, the shoulder J, and pivot G, and stop or stops K, all constructed and operating as and for the purpose herein described.

In witness whereof I hereunto set my hand this 26th day of January, 1872.

BERNHARD WELTECK.

In presence of—
WILLIAM MALLER,
E. CONOREUX.